US008811518B2

(12) United States Patent
Li et al.

(10) Patent No.: US 8,811,518 B2

(45) Date of Patent: Aug. 19, 2014

(54) METHOD AND TRANSMITTER FOR TRANSMITTING SIGNAL AND RECEIVER THEREOF IN WIRELESS COMMUNICATION SYSTEM

(75) Inventors: Jianjun Li, Seoul (KR); Kyoungmin Park, Goyang-si (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/505,707

(22) PCT Filed: Nov. 2, 2009

(86) PCT No.: PCT/KR2009/006398

§ 371 (c)(1), (2), (4) Date: May 2, 2012

(87) PCT Pub. No.: WO2011/052833

PCT Pub. Date: May 5, 2011

(65) Prior Publication Data

US 2012/0219091 A1 Aug. 30, 2012

(51) Int. Cl.

*H04B 7/02* (2006.01)

*H04L 1/02* (2006.01)

(52) U.S. Cl.

USPC ............................ 375/267; 375/316; 375/296

(58) Field of Classification Search

USPC ......................................... 375/296, 316, 267

See application file for complete search history.

(56) References Cited

U.S. PATENT DOCUMENTS

| | | | | |
|---|---|---|---|---|
| 2006/0039497 | A1 | 2/2006 | Vu et al. | |
| 2007/0274411 | A1 | 11/2007 | Lee et al. | |
| 2009/0154577 | A1* | 6/2009 | Lindoff et al. | 375/260 |
| 2010/0039928 | A1* | 2/2010 | Noh et al. | 370/210 |
| 2010/0041350 | A1* | 2/2010 | Zhang et al. | 455/101 |

FOREIGN PATENT DOCUMENTS

| | | |
|---|---|---|
| KR | 10-2008-0076683 | 8/2008 |
| KR | 10-2009-0042991 | 5/2009 |
| KR | 10-2009-0080546 | 7/2009 |

OTHER PUBLICATIONS

International Search Report of PCT/KR2009/006398 dated Jul. 27, 2010.

Written Opinion of PCT/KR2009/006398 dated Jul. 27, 2010.

* cited by examiner

*Primary Examiner* — Chieh M Fan

*Assistant Examiner* — Brian J Stevens

(74) *Attorney, Agent, or Firm* — H.C. Park & Associates, PLC

(57) ABSTRACT

A transmitter includes a layer mapper and a precoder. The layer mapper is configured to map 2 codewords to 3 layers to output a mapped set of 3 symbols. A first codeword is mapped into one layer, and a second codeword is mapped into two layers. The precoder is configured to precode the mapped set of 3 symbols using a precoding matrix that distributes the mapped set of 3 symbols across 4 antenna ports so that each codeword is distributed across 2 antenna ports.

12 Claims, 4 Drawing Sheets

METHOD AND TRANSMITTER FOR TRANSMITTING SIGNAL AND RECEIVER THEREOF IN WIRELESS COMMUNICATION SYSTEM

CROSS-REFERENCE TO RELATED APPLICATIONS

This application is the National Stage Entry of International Application No. PCT/KR2009/006398, filed on Nov. 2, 2009, which is hereby incorporated by reference for all purposes as if fully set forth herein.

BACKGROUND

1. Field

The present invention relates to precoding the signal in wireless communication system.

2. Discussion of the Background

There are a number of multi-antenna transmission schemes or transmission such as transit diversity, closed-loop spatial multiplexing or open-loop spatial multiplexing. Closed-loop MIMO (CL-MIMO) relies on more extensive feedback from the mobile terminal.

SUMMARY

In accordance with an aspect, there is provided a method or a system, comprising: mapping the (n) number of codewords (n is the natural number) to the (m) number of layers to output a mapped set of (m) symbols (m is the natural number more than n and not a multiple of n) precoding the mapped set of (m) symbols using a precoding matrix so that all the codewords have the same antenna ports and antenna correlation property and transmitting a signal that comprises the precoded set of symbols.

In accordance with the other aspect, there is provided a transmitter, comprising: a layer mapper configured to map the (n) number of codewords (n is the natural number) to the (m) number of layers to output a set of (m) symbols (m is the natural number more than n and not a multiple of n) a precoder configured to precode a codeword based optimized mapping set of (m) symbols using a precoding matrix so that all the codewords have the same antenna ports and antenna correlation property.

In accordance with another aspect, there is provided a receiver comprising: an estimator configured to estimate a downlink channel from a received signal, a post-decoder configured to decode the precoded symbols using a inverse matrix of the precoding matrix of a transmitter and a layer demapper configured to demap the decoded symbol streams in a manner complementary to the mapping performed by the layer mapper of the transmitter to recovers the original data symbols.

In accordance with further aspect, there is provided a method, comprising: mapping the (n) number of codewords (n is the natural number) to the (m) number of layers to output a mapped set of (m) symbols (m is the natural number more than n and not a multiple of n) precoding the mapped set of (m) symbols using a precoding matrix is $U \times \Lambda$ where U is the base matrix for codebook and $\Lambda 0$ is the power allocation matrix, both U and $\Lambda$ are optimized for each codeword, not just layers, the U can make all the codewords have the same antenna ports and antenna correlation property and the $\Lambda$ can make optimal power allocation and transmitting a signal that comprises the precoded set of symbols.

Figure 1:
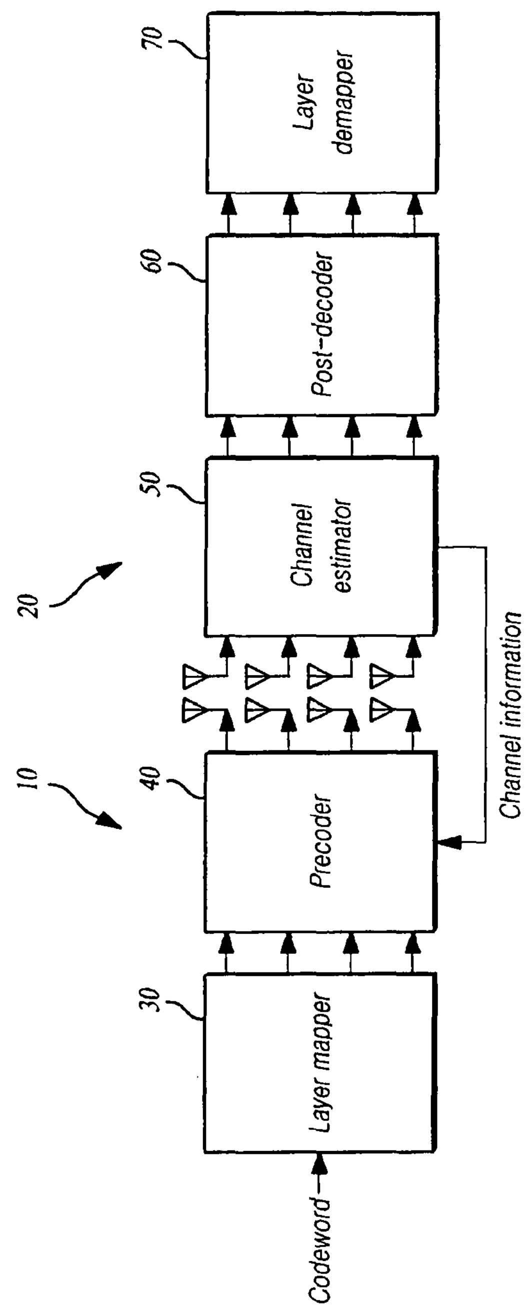
FIG. 1 is the block diagram of the wireless communication system for 4Tx CL-MIMO using closed-loop spatial multiplexing according to one embodiment.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION OF THE ILLUSTRATED EMBODIMENTS

Hereinafter, embodiments of the present invention will be described in detail with reference to the attached drawings.

There are a number of multi-antenna transmission schemes or transmission such as transit diversity, closed-loop spatial multiplexing or open-loop spatial multiplexing. Closed-loop MIMO (CL-MIMO) relies on more extensive feedback from the mobile terminal.

FIG. 1 is the block diagram of the wireless communication system for 4Tx CL-MIMO using closed-loop spatial multiplexing according to one embodiment.

Referring to FIG. 1, the communication system may be any type of wireless communication system, including but not limited to a MIMO system, SDMA system, CDMA system, OFDMA system and OFDM system, etc. In the communication system, the wireless communication system using closed-loop spatial multiplexing according to one embodiment comprises a transmitter 10 and a receiver 20.

For the downlink CL MIMO, the transmitter 10 may act as a base station, while the receiver 20 may act as a subscriber station, which can be virtually any type of wireless one-way or two-way communication device such as a cellular telephone, wireless equipped computer system, and wireless personal digital assistant. Of course, the receiver/subscriber station 20 can also transmits signals which are received by the transmitter/base station 10.

Especially for the uplink CL MIMO, the transmitter 10 may act as a subscriber station, while the receiver 20 may act as a base station.

The signals communicated between the transmitter 10 and the receiver 20 can include voice, data, electronic mail, video, and other data, voice, and video signals.

In operation, the transmitter 10 transmits a signal data stream through one or more antennas and over a channel to a receiver 20, which combines the received signal from one or more receive antennas to reconstruct the transmitted data. To transmit the signal, the transmitter 10 prepares a transmission signal represented by the vector for the signal.

The transmitter 10 comprises a layer mapper 30 and a precoder 40.

The layer mapper 30 of the transmitter 10 may map one or two codewords, corresponding to one or two transport, to the layers $N_L$ which may range from a minimum of one layer up to a maximum number of layers equal to the number of antenna ports. In case of multi-antenna transmission, there can be up to two transport blocks of dynamic size for each TTI (Transmission Time Interval), where each transport block corresponds to one codeword in case of downlink/uplink spatial multiplexing. In other words, the block of modulation symbols (one block per each transport block) refers to as a codeword.

The number of streams capable of being transmitted can be decided according to rank number. The transmitter 10 measures a channel status for each layer, selects the best channel having the best channel status from among several layers, and transmits signal via the selected channel.

Rank adaptation may be considered to enhance the performance according to the change of channel status. For each rank (rank 1 to 4), one mapping relationship between codewords and layers is allowed. For rank 1, a codeword of CW1 (a first codeword block 1) can be transmitted one layers. For rank 2, the transmitter 10 simultaneously transmits two codewords via two layers.

Hereinafter, the rank or the channel rank means the number of layers that should, preferably, be used for downlink transmission to the terminal. For example, the rank 3 means three layers that should, preferably, be used for downlink transmission to the terminal.

FIG. 2 to FIG. 6 are the block diagram of the transmitter of FIG. 1 for 4Tx CL-MIMO according to the other embodiments.

Figure 2:
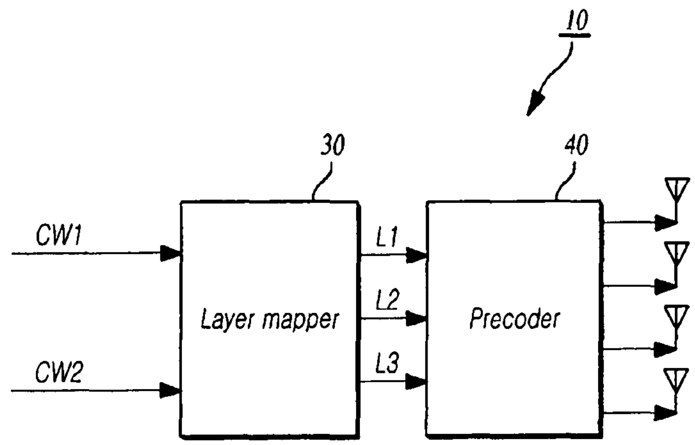
FIGS. 2 to 6 are the block diagram of the transmitter of FIG. 1 for 4Tx CL-MIMO according to the other embodiments.
Figure 3:
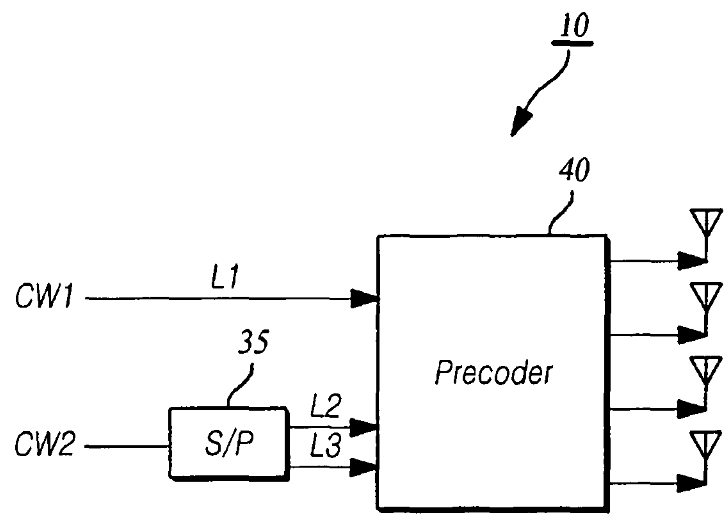

Referring to FIG. 2, for rank 3, the layer mapper 30 may map two set of codewords CW1 and CW2 into three layers L1 to L3. The layer mapper 30 may map one CW1 of codewords into the first layer L1. The layer mapper 30 may map the other CW2 of codewords into the second and the third layers L2 and L3 using a serial to parallel converter 35 as shown in FIG. 3.

After layer mapping by the layer mapper 30, a set of $N_L$ symbols (one symbol from each layer) is linearly combined and mapped to the $N_A$ antenna port by the precoder 40. This combining/mapping can be described by means of a precoding matrix P of size $N_L \times N_A$.

For rank 2 ($N_L$=2) and four transmitting antenna ports ($N_A$=4), the precoder 40 precodes $N_L$ symbols and distributes them across four antenna ports by means of a precoding matrix P of size 2×4.

For rank 3 ($N_L$=3) and four transmitting antenna ports ($N_A$=4), the precoder 40 precodes $N_L$ symbols and distributes them across four antenna ports by means of a precoding matrix P of size 3×4.

For rank 4 ($N_L$=4) and four transmitting antenna ports ($N_A$=4), the precoder 40 precodes $N_L$ symbols and distributes them across four antenna ports by means of a precoding matrix P of size 4×4.

The precoder 40 has its own codebook, which is accessed to obtain a transmission profile and/or precoding information to be used to process the input data signal to make best use of the existing channel conditions for individual receiver stations.

Figure 4:
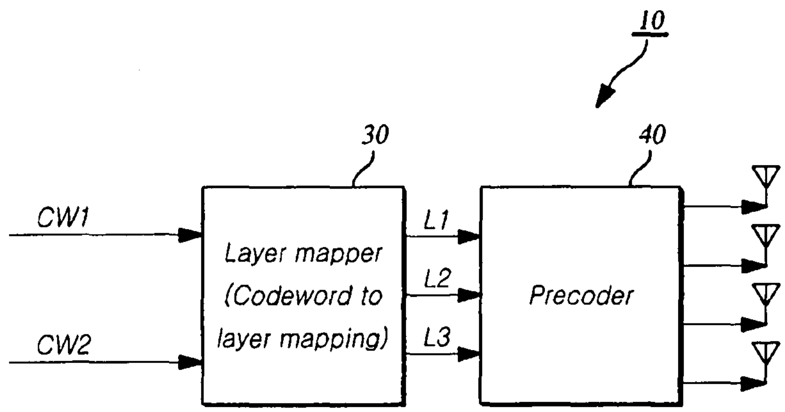

For Rank 3, there is unbalance on layers allocation to different codeword. So the codebook design for rank 3 is special. As shown in FIG. 4, the optimization for rank 3 codebook design is codeword based. We consider not only the precoding structure from 3 layers to the 4 Tx antennas, but also another structure for the codeword to layer mapping. We optimize the codebook design by this two codeword based optimization for every property such as distance, antenna correlation, power allocation and so on.

In addition, the receiver 20 includes the same codebook for use in efficiently transferring information on either the feedback or feedforward channel.

Distance Property and Antenna Correlation

In the proposed rank 3 codebook design schemes, the balance power amplifier is considered for each antenna to make each antenna the same transmit power. The balance power amplifier should be fully and equally utilized to ensure this where the vector norm of each row of a precoding vector/matrix shall be the same.

The chordal distance between two matrices is defined as formula 1.

$$d(U,V)=\frac{1}{\sqrt{2}}\|UU^H-VV^H\|_F \quad \text{[Math Figure 1]}$$

where $$\|U\|_F=\|V\|_F=1.$$

A low CMP (Cubic Matrix-preserving) is a reasonable criterion for the codebook design in the power limited scenario.

One CMP codebook is proposed for UL 4Tx MIMO Rank 3, as shown in Table 1. Table 1 is Cubic Metric Preserving codebook for UL 4Tx MIMO Rank 3.

TABLE 1

| | | | |
|---|---|---|---|
| $\begin{bmatrix}1&0&0\\0&1&0\\x&0&0\\0&0&1\end{bmatrix}$ | $\begin{bmatrix}0&1&0\\1&0&0\\0&0&1\\x&0&0\end{bmatrix}$ | $\begin{bmatrix}1&0&0\\x&0&0\\0&1&0\\0&0&1\end{bmatrix}$ | $\begin{bmatrix}0&1&0\\0&0&1\\1&0&0\\x&0&0\end{bmatrix}$ |

x = {+1, −1, +j, −j}.?

However, if norms of column vectors are fixed to be same, Pas (balance power amplifier) lose the balance consequently. If norms of row vectors are set to be same, layer power imbalance issue rises. The power ratio of the 3 layers is 2:1:1 for CMP Rank 3 codebook.

A rank-3 CMF (Cubic Matrix-friendly) precoding matrix can be written as follows.

$$W=\Pi\begin{bmatrix}1&1&0\\x&u&0\\y&0&1\\z&0&v\end{bmatrix} \quad \text{[Math Figure 2]}$$

Here, Π is a row permutation matrix. The constant normalization factor is the Frobenius-norm of the matrix w.

In formula 2, the transmit power across the three layers (three columns) is equalized via diagonal scaling. It should be noted that such fixed scaling precludes layer-specific power control (open or closed loop). Consequently, the scaled CM-friendly precoding matrix can be written as follows.

$$W = \Pi\begin{bmatrix} 1 & 1 & 0 \\ x & -x & 0 \\ y & 0 & 1 \\ z & 0 & -y^*/z^* \end{bmatrix}\begin{bmatrix} 1/\sqrt{2} & 0 & 0 \\ 0 & 1 & 0 \\ 0 & 0 & 1 \end{bmatrix}$$ [Math Figure 3]

Both cubic metric preserving (CMP), cubic metric friendly (CMF) and the mixed structure of both are proposed. However, in their codebook design, they does not consider the special codeword to layer mapping for rank 3 to optimize the performance. Since the final system performance is layer based, the previous codebook design can not achieve the final optimal performance.

In these embodiments, an optimized rank 3 codebook design method is proposed based on the rank 3 codeword to layer mapping for UL 4Tx MIMO. Moreover, the optimized distance property and antenna correlation by the codeword based optimization with the CMP or CMF has been taken into account. The codebook should have good distance properties (e.g. measured by the chordal distance) to ensure good performances in low correlated scenario.

For the CMF codeword, the first codeword has 4 Tx antennas to transmit, and for the second codeword, each layer also has 2 Tx antennas to transmit. We need optimized the weight for all layers and codeword, not just antenna selection. Consider the second codeword has two layers. We put more effort on the second codeword. If we define the codebook for each codeword is $C_1=\{W_i^{(1)}|i=0, 1, L, CZ-1\}$ for codeword 1 and.

$C_2=\{W_i^{(2,3)}|i=0, 1, L, CZ-1\}$ is for codeword 2.

Where $C=\{W_i|i=0, 1, L, CZ-1\}$ is the rank 3 codebook and CZ is the codebook size.

$W_i^{(1)}$ is the first column of the ith matrix in the codebook.

$W_i^{(2,3)}$ is the second and third column of the ith matrix in the codebook. We can define the codebook size of C1 and C2 as effective codebook size of codeword 1 and codeword 2.

In the codebook design, we try to make the effective codebook size for each codebook the same. And put more priority on the second codeword so that the final performance is the same.

The rank 3 codebook is designed by codeword based optimization. The rank 3 codebook is designed in the form of the base matrix for codebook U.

The base matrix for codebook U is optimized by the distance property and antenna correlation for each codeword.

The above-described is said that for rank 3, the layer mapper 30 may map one of codewords into only one layer and the other of codewords into two layers and the precoder 40 precodes $N_L$ symbols and distributes them across four antenna ports by means of a precoding matrix P of size 3×4.

In this case, one of codewords is mapped into only one layer which is allocated more antenna ports, for example of four antennas, two antenna ports for balance diversity gain. Antenna correlation property is also considered to optimize the antenna allocation especially when cross polarized antenna is used. Usually the antennas with larger distance and high different polarization may be allocated to one of codewords and the other is allocated for the other of codewords.

For non-uniform antenna configurations such as dual-polarized arrays, the antenna element indexing is crucial since it may affect the performance due to the non-uniform correlation profile.

Figure 7:
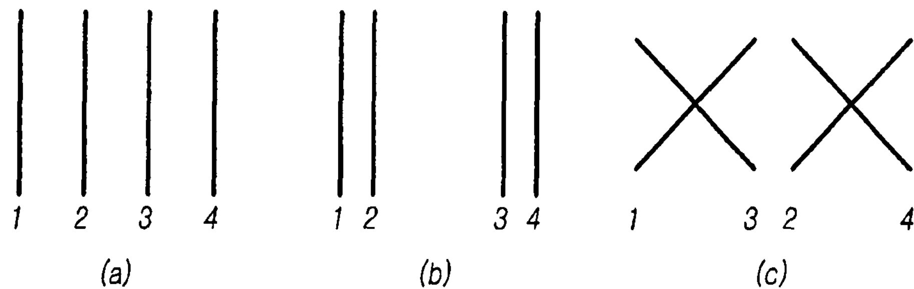
FIG. 7 depicts the indexing which we assume in this contribution (transmitter and receiver).

FIG. 7 depicts the indexing which we assume in this contribution (transmitter and receiver).

The antenna indexing is used to enumerate the spatial channel coefficients $H_{n,m}$ where n and m are the receiver and transmitter antenna indices, respectively.

The indexing for the 2 pairs of cross-polarized antennas (FIG. 7(*c*)) represents the grouping of two antennas with the same polarization which tend to be more correlated. This is analogous to the indexing of 2 pairs of ULA in FIG. 7(*b*).

Table 2 is the base matrix for codebook U of codeword based optimization for distance and antenna correlation for FIG. 7(*a*) and FIG. 7(*b*)

TABLE 2

| | | | | |
|---|---|---|---|---|
| Index 0~3 | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ j & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2}\begin{bmatrix} 1 & 0 & 0 \\ 0 & 1 & 0 \\ -j & 0 & 0 \\ 0 & 0 & 1 \end{bmatrix}$ |
| Index 4~7 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ j & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 0 & 0 & 1 \\ -j & 0 & 0 \end{bmatrix}$ |

Figure 5:
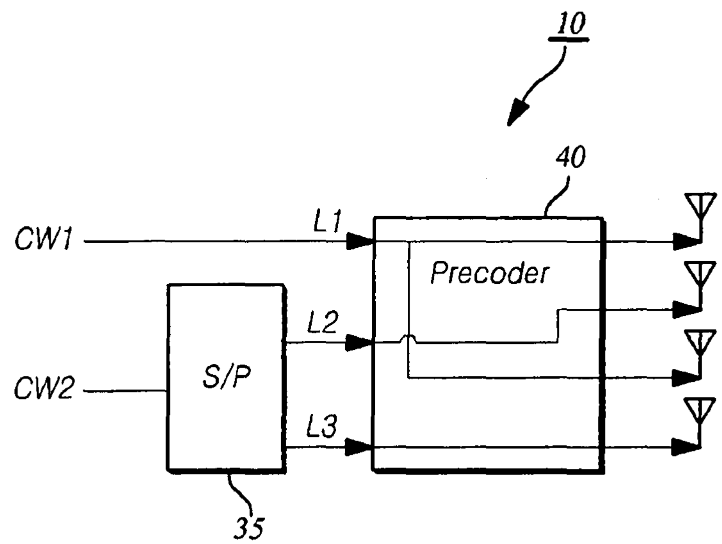
Figure 6:
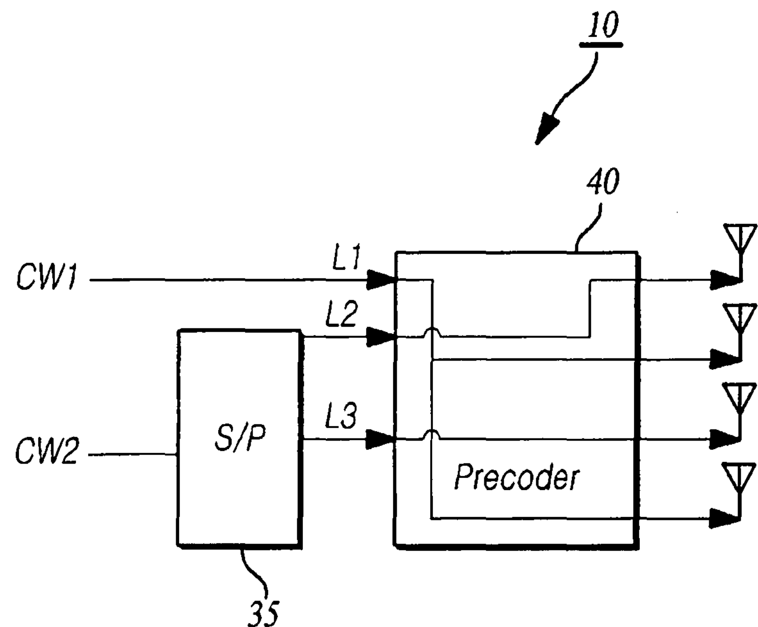

By the codebook in Table 2, the codewords to antenna port are shown in FIGS. 5 and 6 according to index 0~3 and index 4~7.

Table 3 is the base matrix for codebook U of codeword based optimization for distance and antenna correlation for FIG. 7(*c*)

TABLE 3

| I | | | | |
|---|---|---|---|---|
| Index 0~3 | $\frac{1}{2}\begin{bmatrix}1&0&0\\0&1&0\\0&0&1\\1&0&0\end{bmatrix}$ | $\frac{1}{2}\begin{bmatrix}1&0&0\\0&1&0\\0&0&1\\j&0&0\end{bmatrix}$ | $\frac{1}{2}\begin{bmatrix}1&0&0\\0&1&0\\0&0&1\\-1&0&0\end{bmatrix}$ | $\frac{1}{2}\begin{bmatrix}1&0&0\\0&1&0\\0&0&1\\-j&0&0\end{bmatrix}$ |
| Index 4~7 | $\frac{1}{2}\begin{bmatrix}0&1&0\\1&0&0\\1&0&0\\0&0&1\end{bmatrix}$ | $\frac{1}{2}\begin{bmatrix}0&1&0\\1&0&0\\j&0&0\\0&0&1\end{bmatrix}$ | $\frac{1}{2}\begin{bmatrix}0&1&0\\1&0&0\\-1&0&0\\0&0&1\end{bmatrix}$ | $\frac{1}{2}\begin{bmatrix}0&1&0\\1&0&0\\-j&0&0\\0&0&1\end{bmatrix}$ |

Table 3 is the base matrix for codebook U of codeword based optimization for distance and antenna correlation for FIG. 7(*c*)

TABLE 4

| I | | | | |
|---|---|---|---|---|
| Index 0 to 3 | $\begin{bmatrix}1&1&0\\-1&1&0\\1&0&1\\-1&0&1\end{bmatrix}\Lambda$ | $\begin{bmatrix}1&1&0\\-1&1&0\\-1&0&1\\1&0&-1\end{bmatrix}\Lambda$ | $\begin{bmatrix}1&1&0\\-1&1&0\\j&0&1\\1&0&j\end{bmatrix}\Lambda$ | $\begin{bmatrix}1&1&0\\-1&1&0\\-j&0&1\\1&0&-j\end{bmatrix}\Lambda$ |
| Index 4 to 7 | $\begin{bmatrix}1&1&0\\1&-1&0\\1&0&1\\-1&0&1\end{bmatrix}\Lambda$ | $\begin{bmatrix}1&1&0\\1&-1&0\\1&0&1\\1&0&-1\end{bmatrix}\Lambda$ | $\begin{bmatrix}1&1&0\\1&-1&0\\1&0&1\\-j&0&j\end{bmatrix}\Lambda$ | $\begin{bmatrix}1&1&0\\1&-1&0\\1&0&1\\j&0&-j\end{bmatrix}\Lambda$ |
| Index 8 to 11 | $\begin{bmatrix}1&1&0\\-j&j&0\\1&0&1\\-1&0&1\end{bmatrix}\Lambda$ | $\begin{bmatrix}1&1&0\\-j&j&0\\1&0&1\\1&0&-1\end{bmatrix}\Lambda$ | $\begin{bmatrix}1&1&0\\-j&j&0\\1&0&1\\-j&0&j\end{bmatrix}\Lambda$ | $\begin{bmatrix}1&1&0\\-j&j&0\\1&0&1\\j&0&-j\end{bmatrix}\Lambda$ |
| Index 12 to 15 | $\begin{bmatrix}1&1&0\\j&-j&0\\j&0&1\\-j&0&1\end{bmatrix}\Lambda$ | $\begin{bmatrix}1&1&0\\j&-j&0\\j&0&1\\j&0&-1\end{bmatrix}\Lambda$ | $\begin{bmatrix}1&1&0\\j&-j&0\\1&0&1\\-j&0&j\end{bmatrix}\Lambda$ | $\begin{bmatrix}1&1&0\\-j&j&0\\1&0&1\\j&0&-j\end{bmatrix}\Lambda$ |

Table 4 is the base matrix for codebook U of codeword based optimization for CMF codebook. Where the codebook is optimized the second codeword has the same effective codebook size as the first codeword.

The layer mapper 30 may map one CW1 of codewords into the first layer L1. the layer mapper 30 may map the other CW2 of codewords into the second and the third layers L2 and L3 using a serial to parallel converter 35 as shown in FIG. 3.

For rank 3 ($N_L$=3) and four transmitting antenna ports ($N_A$=4), the precoder 40 precodes $N_L$ symbols and distributes them across four antenna ports by means of a precoding matrix P of size 3×4 from the codebook.

Figure 8:
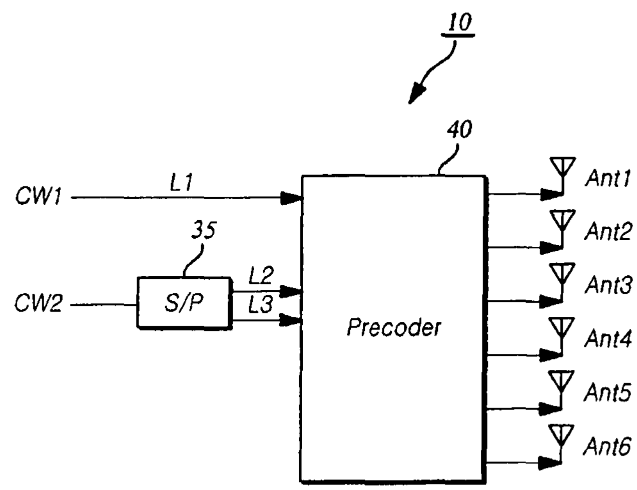
FIG. 8 is the block diagram of the transmitter of FIG. 1 for 2nTx (n is the number of codewords) CL-MIMO according to another embodiment.

FIG. 8 is the block diagram of the transmitter of FIG. 1 for 6TxCL-MIMO for rank 3 according to further another embodiment.

For rank 3 ($N_L$=3), 6 transmitting antenna ports ($N_A$=6) and two codewords, the layer mapper 30 may map one CW1 of codewords into the first layer L1. The layer mapper 30 may map the other CW2 of codewords into the second and the third layers L2 and L3 using a serial to parallel converter 35. The precoder 40 precodes $N_L$ symbols and distributes them across 6 antenna ports by means of a precoding matrix P of size 3×6 as follows.

$$\begin{pmatrix} 1 & 0 & 0 \\ 1 & 0 & 0 \\ 1 & 0 & 0 \\ 0 & 1 & 0 \\ 0 & 1 & 0 \\ 0 & 0 & 1 \end{pmatrix}$$ [Math Figure 4]

In this case, one of codewords is mapped into only one layer which is allocated three antenna ports for balance diversity gain. The other of codewords is mapped into two layers which are allocated three antenna ports.

Figure 9:
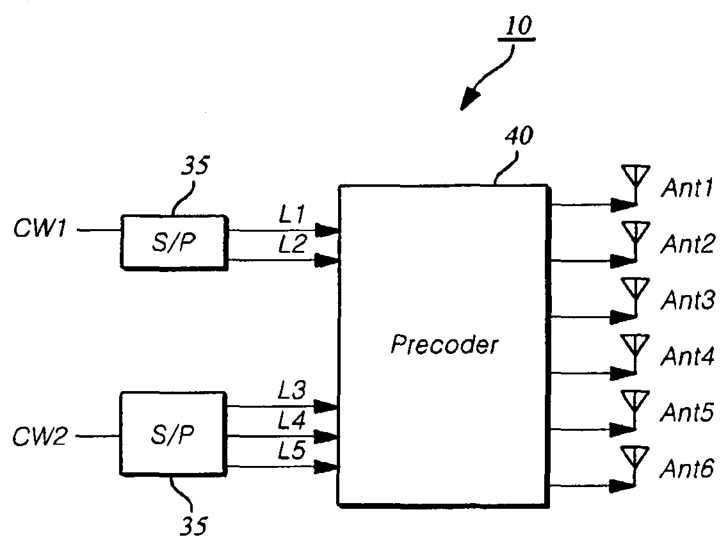
FIG. 9 is the block diagram of the transmitter of FIG. 1 for 6Tx CL-MIMO according to further another embodiment.

FIG. 9 is the block diagram of the transmitter of FIG. 1 for 6Tx CL-MIMO for rank 3 according to further another embodiment.

For rank 5 ($N_L$=5), 6 transmitting antenna ports ($N_A$=6) and two codewords, the layer mapper 30 may map one CW1 of codewords into the first and the second layers L1 and L2 using a serial to parallel converter 35. The layer mapper 30 may map the other CW2 of codewords into the third to fifth layers L3 to L5 using a serial to parallel converter 35.

The precoder 40 precodes 5 symbols and distributes them across 6 antenna ports by means of a precoding matrix P of size 5×6.

In this case, one of codewords is mapped into only two layers which are allocated three antenna ports for balance diversity gain. The other of codewords is mapped into three layers which are allocated three antenna ports.

When the number of codewords is more than 3, functions of the layer mapper 30 and the precoder 40 is the same as described above.

Power Allocation

The power allocation is optimized for each codeword for CMF. The rank 3 codebook is designed by codeword based optimization. The rank 3 codebook is designed in the form of U×Λ, where U is the base matrix for codebook and Λ is the power allocation matrix. The base matrix for codebook U is the same as described above.

The power allocation matrix Λ for each codeword is in the form of formula 5.

$$\Lambda = \begin{bmatrix} \sqrt{\lambda_1} & 0 & 0 \\ 0 & \sqrt{\lambda_2} & 0 \\ 0 & 0 & \sqrt{\lambda_3} \end{bmatrix}$$ [Math Figure 5]

In formula 5, $\lambda_1$, $\lambda_2$, $\lambda_3$ are power allocation factor and $\lambda_1+\lambda_2+\lambda_3=1$. $\lambda_1$ is for the first codeword CW1, and $\lambda_2$, $\lambda_3$ is for second codeword cw2 based on the LTE codeword to layer mapping pattern. That is to find the optimal power allocation factor in the way that $\lambda_1$ Vs. $\lambda_2=\lambda_3$.

Table 5 is the rank 3 codebook of U×Λ for codeword based optimization for power allocation.

TABLE 5

| | | | |
|---|---|---|---|
| Index 0~3 | $\begin{bmatrix} \sqrt{0.5} & 0 & 0 \\ 0 & 1 & 0 \\ \sqrt{0.5} & 0 & 0 \\ 0 & 0 & 1 \end{bmatrix}$ | $\begin{bmatrix} \sqrt{0.4} & 0 & 0 \\ 0 & \sqrt{0.3} & 0 \\ 0 & 0 & \sqrt{0.3} \end{bmatrix}$ | . . . . . . . . . |
| Index 4~7 | . . . | | . . . . . . . . . |

Layer Shifting and Receiver Type

The codebook is optimized by taking the receiver type and the layer shifting into account.

For the MMSE receiver, the above optimization is enough. Since the SIC receiver is also codeword based, it need to be considered for another optimization. For rank 3, it is possible to detect the second codeword at first since it has two layer signals. After it removes the second codeword, there will be no interference any more. So power allocation factor need to be further optimized for the SIC receiver.

Moreover, if layer shifting is considered, we also should re-optimize the codebook design. Because there is also high diversity for the first codeword, it is better to design the codebook also in layer shift way as in the example.

Table 6 is Codebook for codeword based optimization for layer shifting.

TABLE 6

| | | | | |
|---|---|---|---|---|
| Index 0~3 I | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ 0 & 1 & 0 \\ 0 & 0 & 1 \end{bmatrix}$ | $\frac{1}{2}\begin{bmatrix} 0 & 0 & 1 \\ 0 & 1 & 0 \\ 0 & 0 & 1 \\ 1 & 0 & 0 \end{bmatrix}$ | . . . |

It should be noted that all the optimization in the proposed algorithm is codeword based, not layer based.

In the previous rank 3 codebook design for UL MIMO, they does not consider the special codeword to layer mapping for rank 3 to optimize the performance. Since the final system performance is layer based, the previous codebook design can not achieve the final optimal performance.

In these embodiments, an optimized rank codebook design method is proposed based on the rank codeword to layer mapping.

Since link adaptation is codeword based in the proposed codebook design, we optimized the codebook design by allocating antenna ports, power between different codewords to get the final optimal performance. Moreover, antenna cross polarized, layer shifting and receiver type is also considered for the codebook design.

To assist the transmitter in selecting a suitable precoding matrix for transmission by the transmitter 10, the receiver 20 may report channel information such as a recommended number of layers (expressed as a Rank Indication, RI) or a recommended precoding matrix (Precoding Matrix Index, PMI) corresponding to that number of layers, depending on estimates of the downlink channel conditions.

Referring to FIG. 1 again, the receiver 20 comprises a channel estimator 50, a post-decoder 60 and a layer demapper 70.

The channel estimator 50 of the receiver 20 estimates the downlink channel condition. The channel estimator 50 feedbacks at least one of RI and PMI to the transmitter 10. The channel estimator 50 may perform many kinds of codebook based PMI feedback.

The receiver 20 estimates the channel by the channel estimator 50. Based on the estimated channel information, then the receiver 20 selects the precoding matrix for each level from the corresponding codebooks. Once the precoding matrix for each level is decided, the receiver 20 separately feedback the PMIs of both level to the transmitter 10.

There is codebook based PMI feedback where the receiver 20 feedbacks the precoding matrix index (PMI) of the favorite matrix in the codebook to the transmitter 10 to support CL-MIMO (closed MIMO) operation in wireless communication system.

The receiver 20 recovers the original data symbols by the post-decoder 60 with the previous feedback precoding matrices combination. The post-decoder 60 processes the received signal and decodes the precoded symbols.

For example, the post-decoder 60 decodes the precoded symbols using a inverse matrix of the precoding matrix P, for example U or U×Λ as described above.

The layer demapper 70 may demap the decoded symbol streams in a manner complementary to the mapping performed by the layer mapper 30 to recovers the original data symbols.

The above embodiments are described that the number of codewords is equal 1 or 2 and the rank number is equal to 3 or 5, the number of antennas (or antenna ports) is equal to 4 or 6.

In general, the number of codewords may be n which is the natural number. The number of layers may be m which is the natural number more than n and not a multiple of n. the number of antennas (or antenna ports) may be a multiple of the number of codewords.

Therefore, there is a method comprising: mapping the (n) number of codewords (n is the natural number) to the (m) number of layers (m is the natural number more than n and not a multiple of n) and precoding a mapped set of (m) symbols using a precoding matrix so that all the codewords have the same antenna ports and antenna correlation property where the number of antenna ports may be a multiple of the number of codewords.

The methods and systems as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, and so on) and/or at the receiver (e.g., recovering the transmitted signals, demodulating and decoding the recovered signals, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of transmitting a signal from an apparatus, the apparatus comprising at least one processor, the method comprising:

mapping 2 codewords to 3 layers to output a mapped set of 3 symbols, wherein a first codeword is mapped into one layer, and a second codeword is mapped into two layers;

precoding, by the processor, the mapped set of 3 symbols using a precoding matrix that distributes the mapped set of 3 symbols across 4 antenna ports so that each codeword is distributed across 2 antenna ports; and transmitting a signal that comprises the precoded set of symbols, wherein the precoding matrix has 3 columns and 4 rows, the first column of the precoding matrix has 2 non-zero elements and 2 zero elements, and the second column and the third column of the precoding matrix each have 1 non-zero element and 3 zero elements, wherein the 2 non-zero elements in the first column, the 1 non-zero element in the second column, and the 1 non-zero element in the third column are arranged in different rows from each other, and wherein the precoding matrix is selected from a set of precoding matrices, the set of precoding matrices is divided into 2 codebook subsets, a first codebook subset of the 2 codebook subsets includes 4-by-1 submatrices each having 1 column and 4 rows for the first codeword, a second codebook subset of the 2 codebook subsets includes 4-by-2submatrices each having 2 columns and 4 rows for the second codeword, and each 4-by-1 submatrix in the first codebook subset is different from each other.

2. The method of claim 1, wherein a number of elements of the second codebook subset is determined to have a codebook size to obtain a same final optimal codeword performance between the first codeword and the second codeword.

3. The method of claim 1, wherein the mapped first codeword is configured to be distributed across 2 antenna ports of the 4 antenna ports to obtain diversity gain, and the mapped second codeword is configured to be distributed across the other 2 antenna ports of the 4 antenna ports for antenna selection.

4. A transmitter, comprising:

a layer mapper configured to map 2 codewords to 3 layers to output a mapped set of 3 symbols, wherein a first codeword is mapped into one layer, and a second codeword is mapped into two layers; and a precoder configured to precode the mapped set of 3 symbols using a precoding matrix that distributes the mapped set of 3 symbols across 4 antenna ports so that each codeword is distributed across 2 antenna ports, wherein the precoding matrix has 3 columns and 4 rows, the first column of the precoding matrix has 2 non-zero elements and 2 zero elements, and the second column and the third column of the precoding matrix each have 1 non-zero element and 3 zero elements, wherein the 2 non-zero elements in the first column, the 1 non-zero element in the second column, and the 1 non-zero element in the third column are arranged in different rows from each other, and wherein the precoding matrix is selected from a set of precoding matrices, the set of precoding matrices is divided into 2 codebook subsets, a first codebook subset of the 2 codebook subsets includes 4-by-1 submatrices each having 1 column and 4 rows for the first codeword, a second codebook subset of the 2 codebook subsets includes 4-by-2 submatrices each having 2 columns and 4 rows for the second codeword, and each 4-by-1 submatrix in the first codebook subset is different from each other.

5. The transmitter of claim 4, wherein a number of elements of the second codebook subset is determined to have a codebook size to obtain a same final optimal codeword performance between the first codeword and the second codeword.

6. The transmitter of claim 4, wherein the mapped first codeword is configured to be distributed across 2 antenna ports of the 4 antenna ports to obtain diversity gain, and the mapped second codeword is configured to be distributed across the other 2 antenna ports of the 4 antenna ports for antenna selection.

7. A receiver, comprising:

a post-decoder configured to decode a precoded set of symbols into decoded symbols using an inverse matrix of a precoding matrix of a transmitter; and a layer-demapper configured to demap the decoded symbols in a manner complementary to a mapping performed by the transmitter to recover original data, wherein the mapping performed by the transmitter includes mapping 2 codewords to 3 layers to output a mapped set of 3 symbols, wherein a first codeword is mapped into one layer, and a second codeword is mapped into two layers, and wherein the mapped set of 3 symbols are precoded by the transmitter using the precoding matrix that distributes the mapped set of 3 symbols across 4 antenna ports so that each codeword is distributed across 2 antenna ports, wherein the precoding matrix has 3 columns and 4 rows, the first column of the precoding matrix has 2 non-zero elements and 2 zero elements, and the second column and the third column of the precoding matrix each have 1 non-zero element and 3 zero elements, wherein the 2 non-zero elements in the first column, the 1 non-zero element in the second column, and the 1 non-zero element in the third column are arranged in different rows from each other, and wherein the precoding matrix is selected from a set of precoding matrices, the set of precoding matrices is divided into 2 codebook subsets, a first codebook subset of the 2 codebook subsets includes 4-by-1 submatrices each having 1 column and 4 rows for the first codeword, a second codebook subset of the 2 codebook subsets includes 4-by-2 submatrices each having 2 columns and 4 rows for the second codeword, and each 4-by-1 submatrix in the first codebook subset is different from each other.

8. The receiver of claim 7, wherein a number of elements of the second codebook subset is determined to have a codebook size to obtain a same final optimal codeword performance between the first codeword and the second codeword.

9. The receiver of claim 7, wherein the mapped first codeword is configured to be distributed across 2 antenna ports of the 4 antenna ports to obtain diversity gain, and the mapped second codeword is configured to be distributed across the other 2 antenna ports of the 4 antenna ports for antenna selection.

10. A method of receiving a signal by an apparatus, the apparatus comprising at least one processor, the method comprising:

receiving, from a transmitter, a signal that comprises a precoded set of symbols, the precoded set of symbols being precoded using a precoding matrix of the transmitter;

decoding, by the processor, the precoded set of symbols into decoded symbols using an inverse matrix of the precoding matrix of the transmitter; and demapping the decoded symbols into demapped data according to a demapping process complementary to a mapping process performed by the transmitter, wherein the mapping process performed by the transmitter includes mapping 2 codewords to 3 layers to output a mapped set of 3 symbols, wherein a first codeword is mapped into one layer, and a second codeword is mapped into two layers, and wherein the mapped set of 3 symbols are precoded by the transmitter using the precoding matrix that distributes the mapped set of 3 symbols across 4 antenna ports so that each codeword is distributed across 2 antenna ports, wherein the precoding matrix has 3 columns and 4 rows, the first column of the precoding matrix has 2 non-zero elements and 2 zero elements, and the second column and the third column of the precoding matrix each have 1 non-zero element and 3 zero elements, wherein the 2 non-zero elements in the first column, the 1 non-zero element in the second column, and the 1 non-zero element in the third column are arranged in different rows from each other, and wherein the precoding matrix is selected from a set of precoding matrices, the set of precoding matrices is divided into 2 codebook subsets, a first codebook subset of the 2 codebook subsets includes 4-by-1 submatrices each having 1 column and 4 rows for the first codeword, a second codebook subset of the 2 codebook subsets includes 4-by-2 submatrices each having 2 columns and 4 rows for the second codeword, and each 4-by-1 submatrix in the first codebook subset is different from each other.

11. The method of claim 10, wherein a number of elements of the second codebook subset is determined to have a codebook size to obtain a same final optimal codeword performance between the first codeword and the second codeword.

12. The method of claim 10, wherein the mapped first codeword is configured to be distributed across 2 antenna ports of the 4 antenna ports to obtain diversity gain, and the mapped second codeword is configured to be distributed across the other 2 antenna ports of the 4 antenna ports for antenna selection.

* * * * *